US011594911B2

(12) United States Patent
Takahashi (10) Patent No.: US 11,594,911 B2
(45) Date of Patent: Feb. 28, 2023

(54) POWER SUPPLY SWITCHING CONTROL SYSTEM

(71) Applicant: YAZAKI CORPORATION, Tokyo (JP)

(72) Inventor: Atsushi Takahashi, Susono (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 17/517,660

(22) Filed: Nov. 2, 2021

(65) Prior Publication Data

US 2022/0140646 A1    May 5, 2022

(30) Foreign Application Priority Data

Nov. 5, 2020   (JP) .............................. JP2020-185080

(51) Int. Cl.
*H02J 9/06*    (2006.01)
*B60R 16/033*    (2006.01)
*H02J 7/00*    (2006.01)

(52) U.S. Cl.
CPC ............... *H02J 9/06* (2013.01); *B60R 16/033* (2013.01); *H02J 7/0013* (2013.01)

(58) Field of Classification Search
CPC .......... H02J 9/06; H02J 7/0013; B60R 16/033
USPC ........................................ 307/23, 10.1, 10.6
See application file for complete search history.

(56) References Cited

U.S. PATENT DOCUMENTS

| 5,945,816 | A | 8/1999 | Marusik |
| 9,597,963 | B2* | 3/2017 | Slosarczyk ............. B60L 50/60 |
| 2016/0368437 | A1 | 12/2016 | Boucharel et al. |
| 2018/0290608 | A1 | 10/2018 | Hida |
| 2019/0252908 | A1 | 8/2019 | Takita et al. |
| 2020/0216002 | A1 | 7/2020 | Mazaki et al. |
| 2021/0242712 | A1* | 8/2021 | Izawa ..................... H02J 9/061 |
| 2022/0123547 | A1* | 4/2022 | Ferré Fàbregas et al. ................. H02H 1/0007 |

FOREIGN PATENT DOCUMENTS

| JP | 2004-166437 A | 6/2004 |
| JP | 2017-504305 A | 2/2017 |
| JP | 2018-113783 A | 7/2018 |
| JP | 2019-62727 A | 4/2019 |
| WO | 2020/166267 A1 | 8/2020 |
| WO | 2020/209132 A1 | 10/2020 |

* cited by examiner

*Primary Examiner* — Michael R. Fin
(74) *Attorney, Agent, or Firm* — Kenealy Vaidya LLP (57) ABSTRACT

A power supply switching control system switches a power supply for supplying power to a load between a first power supply and a second power supply in a power supply system. The power supply switching control system includes a first switch provided between the first power supply and the load in the power supply path and configured to cut off a current flowing from the second power supply to the first power supply in an off state of the first switch, a second switch provided between the second power supply and the load in the power supply path and configured to cut off a current flowing from the first power supply to the second power supply in an off state of the second switch, and a control unit configured to set the second switch in an on state when the second power supply is charged.

6 Claims, 10 Drawing Sheets

POWER SUPPLY SWITCHING CONTROL SYSTEM

CROSS-REFERENCE TO RELATED APPLICATIONS

This application is based on and claims priority under 35 USC 119 from Japanese Patent Application No. 2020-185080 filed on Nov. 5, 2020, the contents of which are incorporated herein by reference.

TECHNICAL FIELD

The present disclosure relates to a power supply switching control system.

BACKGROUND ART

A power supply system is known which includes a plurality of power systems for redundant operation and can use of another power system even when an abnormality occurs in a part of the plurality of power systems see, for example, JP-A-2019-62727 and JP-A-2004-166437). In the power supply system described in JP-A-2019-62727, a power output unit having a power supply and the like and a load are provided in each of power systems, and power is supplied from the power output unit to the load in each of the power systems. Further, in the power supply system described in JP-A-2004-166437, current balance control for causing currents that flow from a plurality of power supplies to a load to coincide with one another is performed.

The power supply systems described in JP-A-2019-62727 and JP-A-2004-166437 are not systems in which any one of a first power supply and a second power supply connected in parallel to a common load supplies power to the common load, so that the common load is made redundant even when a failure occurs in the other of the first power supply and the second power supply.

Solution to Problem

In view of the above-described circumstances, an object of the present disclosure is to provide a power supply switching control system in which any one of a first power supply and a second power supply connected in parallel to a common load supplies power to the common load, so that the common load can be made redundant and the second power supply for backup can be reliably charged.

Aspect of non-limiting embodiments of the present disclosure relates to provide a power supply switching control system configured to switch a power supply for supplying power to a load between a first power supply and a second power supply in a power supply system that includes the first power supply and the second power supply connected in parallel to the load and in which the first power supply, the second power supply, and the load are connected through a power supply path from a side of a power supply unit in an order of the first power supply, the load, and the second power supply, the power supply switching control system including: a first switch that is a MOSFET provided between a connection point of the first power supply and a connection point of the load in the power supply path and configured to cut off a current flowing from a side of the second power supply to a side of the first power supply in an off state of the first switch, a second switch that is a MOSFET provided between a connection point of the second power supply and the connection point of the load in the power supply path and configured to cut off a current flowing from a side of the first power supply to a side of the second power supply in an off state of the second switch, and a control unit configured to set the second switch in an on state when the second power supply is charged.

According to the present disclosure, any one of a first power supply and a second power supply connected in parallel to a common load supplies power to the common load, so that the common load can be made redundant and the second power supply for backup can be reliably charged.

DESCRIPTION OF EMBODIMENTS

Hereinafter, the present disclosure will be described in accordance with preferred embodiments. The present disclosure is not limited to the embodiments described below, and the embodiments described below can be appropriately modified without departing from the gist of the present disclosure. Further, in the embodiments described below, although illustration and description of a part of the configuration are omitted, it is needless to say that a known or well-known technology is appropriately applied to details of the omitted technology within a range in which a contradiction does not occur with the contents described below.

Figure 1:
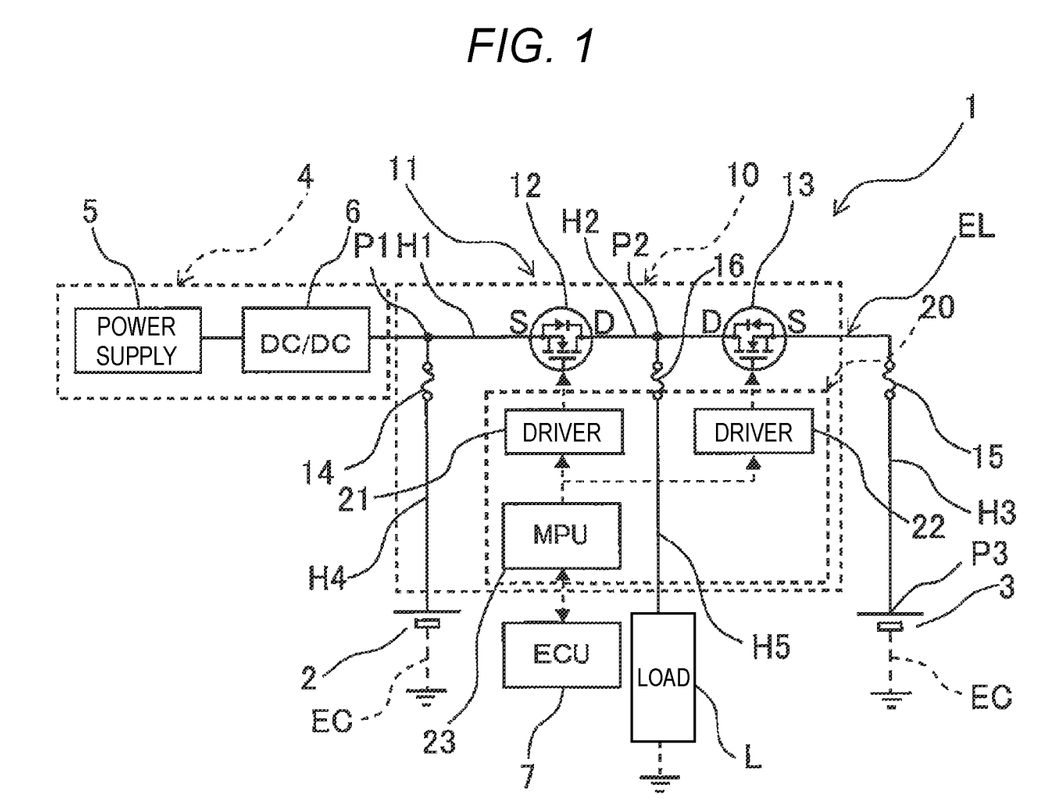
FIG. 1 is a diagram showing an in-vehicle power supply system including a power supply switching control system according to an embodiment of the present disclosure.

FIG. 1 is a diagram showing an in-vehicle power supply system 1 including a power supply switching control system 10 according to an embodiment of the present disclosure. As shown in FIG. 1, the in-vehicle power supply system 1 includes a main battery 2, a sub-battery 3, a power supply unit 4, and the power supply switching control system 10. In the in-vehicle power supply system 1 of the present embodiment, the main battery 2 and the sub-battery 3 are connected to a load L in parallel via a diode OR circuit 11. Normally, power is supplied from the main battery 2 to the load L. When a failure occurs on a main battery 2 side, the power is supplied from the sub-battery 3 to the load L.

In the in-vehicle power supply system 1 of the present embodiment, the main battery 2 is a regular power supply having a rated voltage of 12V, and the sub-battery 3 is an emergency power supply having a rated voltage of 12V. Negative terminals of the main battery 2 and the sub-battery 3 are connected to a body ground via a ground cable EC. At least one of the main battery 2 and the sub-battery 3 may be replaced with another power supply such as a capacitor.

The power supply unit 4 includes a high-voltage (HV) power supply 5 of 48V or the like and a DC/DC converter 6. The power supply 5 outputs high-voltage power to the DC/DC converter 6. The DC/DC converter 6 steps down the high-voltage power output from the power supply 5 and outputs the stepped-down power to the diode OR circuit 11 of the power supply switching control system 10.

The power supply switching control system 10 includes the diode OR circuit 11 and a control apparatus 20. The diode OR circuit 11 includes a first switch 12, a second switch 13, a first protection fuse 14, a second protection fuse 15, and a third protection fuse 16. The first switch 12 and the second switch 13 are N-channel metal-oxide-semiconductor field-effect transistors (MOSFETs). A source S of the first switch 12 and an output terminal of the DC/DC converter 6 are connected by a first wiring H1, and a drain D of the first switch 12 and a drain D of the second switch 13 are connected by a second wiring 112. Further, a source S of the second switch 13 and a positive terminal of the sub-battery 3 are connected by a third wiring H3. The second protection fuse 15 is provided in the third wiring H3. A connection point between a terminal end of the third wiring H3 and the positive terminal of the sub-battery 3 is referred to as a connection point P3.

The first protection fuse 14 is provided in a fourth wiring H4 that branches from a connection point P1 of the first wiring H1. The output terminal of the DC/DC converter 6 and the source S of the first switch 12 are connected to a positive terminal of the main battery 2 via the first protection fuse 14. Further, the third protection fuse 16 is provided in a fifth wiring H5 that branches from a connection point P2 of the second wiring H2. The drain D of the first switch 12 and the drain D of the second switch 13 are connected to the load L via the third protection fuse 16.

The main battery 2, the sub-battery 3, and the load L are connected to a power supply path EL including the first wiring H1, the second wiring H2, and the third wiring H3 from a power supply unit 4 side in an order of the main battery 2, the load L, and the sub-battery 3. Further, the first switch 12 is provided between the connection point P1 and the connection point P2 of the power supply path EL, and the second switch 13 is provided between the connection point P2 and the connection point P3 of the power supply path EL.

The first switch 12 and the second switch 13, which are N-channel MOSFETs, cut off a current from the drain D to the source S in an off state. The first switch 12 in an off state cuts off a current from a sub-battery 3 side to the main battery 2 side. Further, the second switch 13 in an off state cuts off a current from the main battery 2 side to the sub-battery 3 side.

Here, the first switch 12 and the second switch 13 are in an on state to allow a current to flow from the drain D to the source S by applying gate voltages from drivers 21 and 22 described later. Further, even in a state where the gate voltages are not applied from the drivers 21 and 22, the first switch 12 and the second switch 13 are in an on state where a current flows from the source S to the drain D when a voltage on a source S side is higher than a voltage on a drain D side. On the other hand, when the gate voltages are not applied from the drivers 21 and 22 and the voltage on the drain D side is higher than the voltage on the source S side, the first switch 12 and the second switch 13 are in an off state where a current from the drain D to the source S is cut off. In the following description, a state where the first switch 12 and the second switch 13 are turned on by application of the gate voltages from the drivers 21 and 22 is referred to as a forced on state. On the other hand, a state where the first switch 12 and the second switch 13 are turned on when the gate voltages are not applied from the drivers 21 and 22 is referred to as an on state. Further, a state where the first switch 12 and the second switch 13 are turned off when the gate voltages are not applied from the drivers 21 and 22 is referred to as an off state.

When a voltage of the first switch 12 on a source S side is higher than a voltage of the first switch 12 on a drain D side, the first switch 12 is in the on state, and a current flows from the main battery 2 side to a load L side and the sub-battery 3 side. On the other hand, when the voltage of the first switch 12 on the drain D side is higher than the voltage of the first switch 12 on the source S side, the first switch 12 is in the off state to cut off the current from the main batter 2 side to the load L side and the sub-battery 3 side.

When a voltage of the second switch 13 on a source S side is higher than a voltage of the second switch 13 on a drain D side, the second switch 13 is in the on state and a current flows from the sub-battery 3 side to the load L side and the main battery 2 side. On the other hand, when the voltage of the second switch 13 on the drain D side is higher than the voltage of the second switch 13 on the source S side, the second switch 13 is in the off state to cut off the current from the sub-battery 3 side to the load L side and the main battery 2 side.

The control apparatus 20 includes the drivers 21 and 22 and a micro processing unit (MPU) 23. The driver 21 is a gate drive circuit including a resistor, a capacitor, and the like, and switches a gate drive voltage applied to the first switch 12 to a voltage that can be set in the forced on state or a voltage that can be set in the on state and the off state in response to a control signal output from the MPU 23. Further, the driver 22 is a gate drive circuit including a resistor, a capacitor, and the like, and switches a gate drive voltage applied to the second switch 13 to a voltage that can be set in the forced on state or a voltage that can be set in the on state and the off state in response to the control signal output from the MPU 23.

The MPU 23 outputs, to the drivers 21 and 22, a control signal for switching the forced on state/on or off state of the first switch 12 and the second switch 13 in accordance with an on/off instruction from an in-vehicle electronic control unit (ECU) 7. Normally, the MPU 23 supplies power from the power supply unit 4 or the main battery 2 to the load L by setting the first switch 12 in the forced on state and the second switch 13 in the on or off state. When power is supplied from the power supply unit 4 or the main battery 2 to the load L, it is not essential to set the first switch 12 in the forced on state where the gate voltage is applied. Even when the first switch 12 is in the on state where the gate voltage is not applied, power can be supplied from the power supply unit 4 or the main battery 2 to the load L.

On the other hand, when the sub-battery 3 is charged, the MPU 23 sets the first switch 12 and the second switch 13 in the forced on state. When charging the sub-battery 3, it is not essential to set the first switch 12 in the forced on state where the gate voltage is applied. Even when the first switch 12 is in the on stale where the gate voltage is not applied, power can be supplied from the power supply unit 4 or the main battery 2 to the sub-battery 3.

Figure 2:
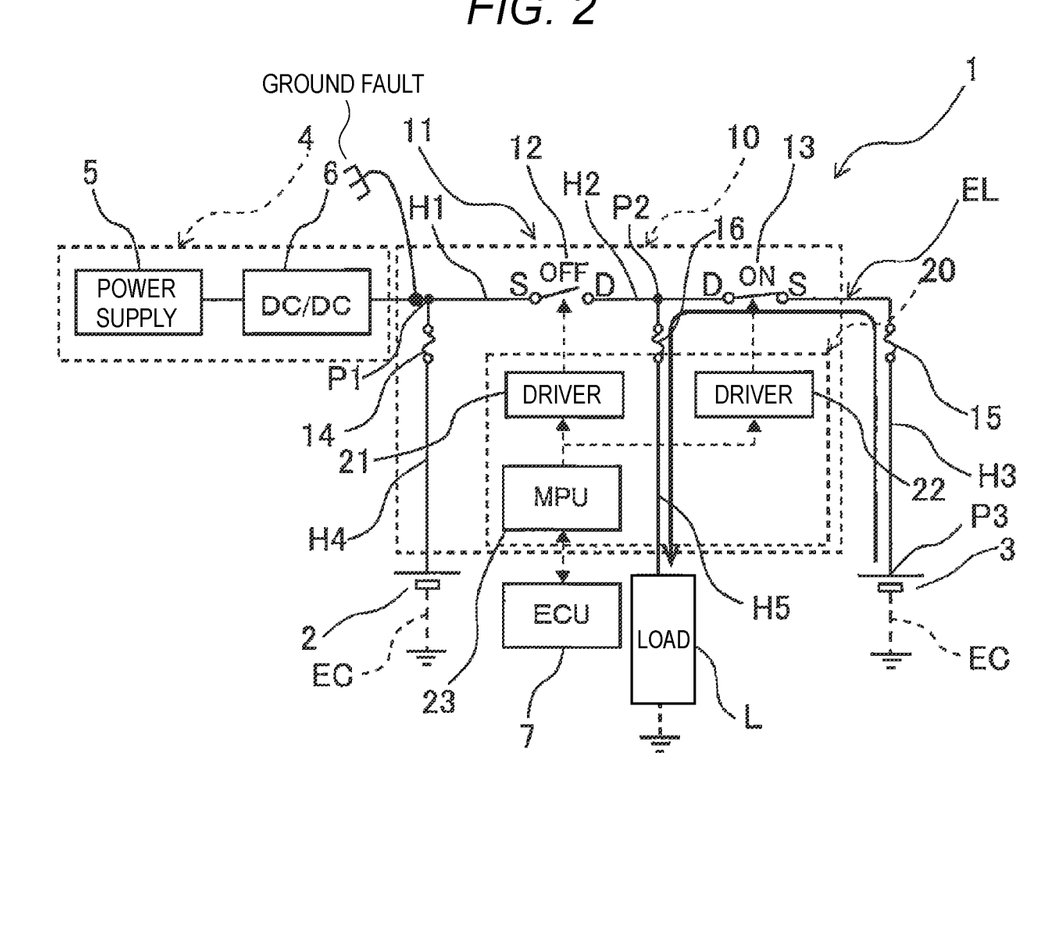
FIG. 2 is a diagram showing functions when a ground fault occurs on a main battery side with respect to a first switch in the in-vehicle power supply system shown in FIG. 1.

FIG. 2 is a diagram showing functions when a ground fault occurs on the main battery 2 side with respect to the first switch 12 in the in-vehicle power supply system 1 shown in FIG. 1. As shown in FIG. 2, when the ground fault occurs on the main battery 2 side (power supply unit 4 side) with respect to the first switch 12, the voltage of the first switch 12 on the source S side is lower than the voltage of the first switch 12 on the drain D side. In this case, when the first switch 12 is in the off state, the first switch 12 cuts off a bidirectional current. On the other hand, the voltage of the second switch 13 on the source S side is higher than the voltage of the second switch 13 on the drain D side. Accordingly, the second switch 13 is in the on state, and a current flows from the sub-battery 3 side to the load L side. At this time, since the first switch 12 cuts off the bidirectional current, no current flows from the sub-battery 3 to the main battery 2, and power is supplied from the sub-battery 3 to the load L.

Although illustration is omitted, when a ground fault occurs on the sub-battery 3 side with respect to the second switch 13, the voltage of the second switch 13 on the source S side is lower than the voltage of the second switch 13 on the drain D side. In this case, when the second switch 13 is in the off state, the second switch 13 cuts off the bidirectional current. On the other hand, the voltage of the first switch 12 on the source S side is higher than the voltage of the first switch 12 on the drain D side. Accordingly, the first switch 12 is in the on state, and a current flows from the main battery 2 side to the load L side. At this time, since the second switch 13 cuts off the bidirectional current, no current flows from the power supply unit 4 or the main battery 2 to the sub-battery 3, and power is supplied from the power supply unit 4 or the main battery 2 to the load L.

As described above, in the power supply switching control system 10 of the present embodiment, the main battery 2 and the sub-battery 3 are connected to the common load L via the diode OR circuit 11 including the first switch 12 and the second switch 13 that are MOSFETs. Accordingly, even when the ground fault occurs on the main battery 2 side or the sub-battery 3 side and any one of the first switch 12 and the second switch 13 is in the off state, power can be supplied to the load L from a battery (or the power supply unit 4) where the ground fault does not occur.

Further, when the main battery 2, the sub-battery 3, and the load L are connected to the power supply path EL from the power supply unit 4 side in the order of the main battery 2, the load L, and the sub-battery 3, the first switch 12 between the main battery 2 and the load L is set in the on state or the forced on state, and the second switch 13 between the load L and the sub-battery 3 is set in the forced on state, so that the sub-battery 3 can be charged by supplying power from the power supply unit 4 or the main battery 2 to the sub-battery 3. Further, when supplying power to the normal load L, the first switch 12 is set in the on state or the forced on state and the second switch 13 is set in the off state, so that power can be supplied from the power supply unit 4 or the main battery 2 to the load L.

The source S of the first switch 12, which is the N-channel MOSFET, is connected to the main battery 2 and the power supply unit 4. The drain D of the second switch 13, which is also the N-channel MOSFET, and the drain D of the first switch 12 are connected to each other and are connected to the load L. Further, the source S of the second switch 13 is connected to the sub-battery 3. Accordingly, when the ground fault occurs on the source S side of the first switch 12 (the main battery 2 side or the power supply unit 4 side), the voltage of the first switch 12 on the source S side is lower than the voltage of the first switch 12 on the drain D side, so that the first switch 12 is in the off state. Accordingly, a current from the sub-battery 3 side to the main battery 2 side can be cut off, and power can be supplied from the sub-battery 3 to the load L. On the other hand, when a ground fault occurs on the source S side of the second switch 13 (sub-battery 3 side), the voltage of the second switch 13 on the source S side is lower than the voltage of the second switch 13 on the drain D side, so that the second switch 13 is in the off state. Accordingly, a current from the main battery 2 side or the power supply unit 4 side to the sub-battery 3 side can be cut off, and power can be supplied from the main battery 2 or the power supply unit 4 to the load L.

Figure 3:
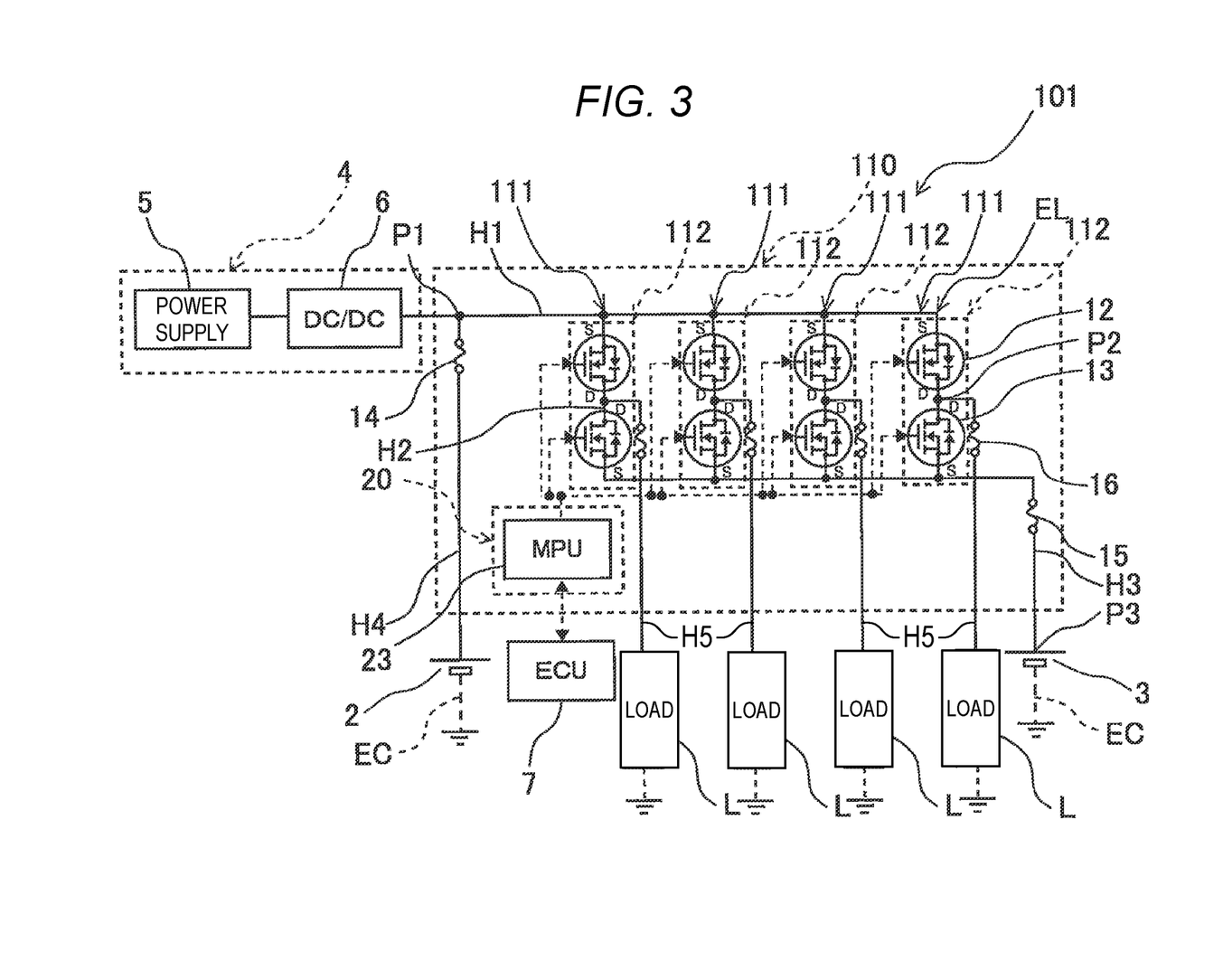
FIG. 3 is a diagram showing an in-vehicle power supply system including a power supply switching control system according to another embodiment of the present disclosure.

FIG. 3 is a diagram showing an in-vehicle power supply system 101 including a power supply switching control system 110 according to another embodiment of the present disclosure. The same reference numerals are given to configurations similar to those of the above-described embodiment, and description of the above-described embodiments is incorporated.

As shown in FIG. 3, the in-vehicle power supply system 101 of the present embodiment includes a plurality of switch units 112 connected in parallel to the power supply path EL and a plurality of loads L. Each of the plurality of switch units 112 includes the first switch 12 and the second switch 13. Further, the load L is provided for each switch unit 112. Each of the plurality of loads L is connected, by the fifth wiring H5, to the second wiring H2 that connects the drain D of the first switch 12 and the drain D of the second switch 13 to each other. Illustration of the drivers 21 and 22 (see FIG. 1) is omitted.

As in the above-described embodiment, in the power supply switching control system 110 of the present embodiment, the main battery 2 and the sub-battery 3 are connected to the common load L via a diode OR circuit 111 including the first switch 12 and the second switch 13, which are MOSFETs. In the power supply switching control system 110 of the present embodiment, a plurality of diode OR circuits 111 that extend from the main battery 2 and the sub-battery 3 to the loads L are provided in parallel. Accordingly, even when a ground fault occurs on a main battery 2 side or a sub-battery 3 side and any one of a plurality of first switches 12 and a plurality of second switches 13 are in the off state, power can be supplied to the plurality of loads L from a battery (or the power supply unit 4) where the ground fault does not occur.

Further, when the main battery 2, the sub-battery 3, and the loads L are connected to the power supply path EL from a power supply unit 4 side in an order of the main battery 2, the loads L, and the sub-battery 3, the plurality of first switches 12 are set in the on state or the forced on state and the plurality of second switches 13 are set in the forced on state, so that the sub-battery 3 can be charged by supplying power from the power supply unit 4 or the main battery 2 to the sub-battery 3. Further, when supplying power to the normal loads L, the plurality of first switches 12 are set in the on state or the forced on state and the plurality of second switches 13 are set in the off state, so that power can be supplied from the power supply unit 4 or the main battery 2 to the plurality of loads L.

Here, in the power supply switching control system 110 of the present embodiment, the first wiring H1 connects the plurality of first switches 12 to the main battery 2 and the power supply unit 4, and the third wiring H3 connects the plurality of second switches 13 to the sub-battery 3. When a failure occurs in the first wiring H1, power can be supplied from the sub-battery 3 to the plurality of loads L through the third wiring H3, and when a failure occurs in the third wiring H3, power can be supplied from the main battery 2 or the power supply unit 4 to the plurality of loads L through the first wiring H1.

Figure 4:
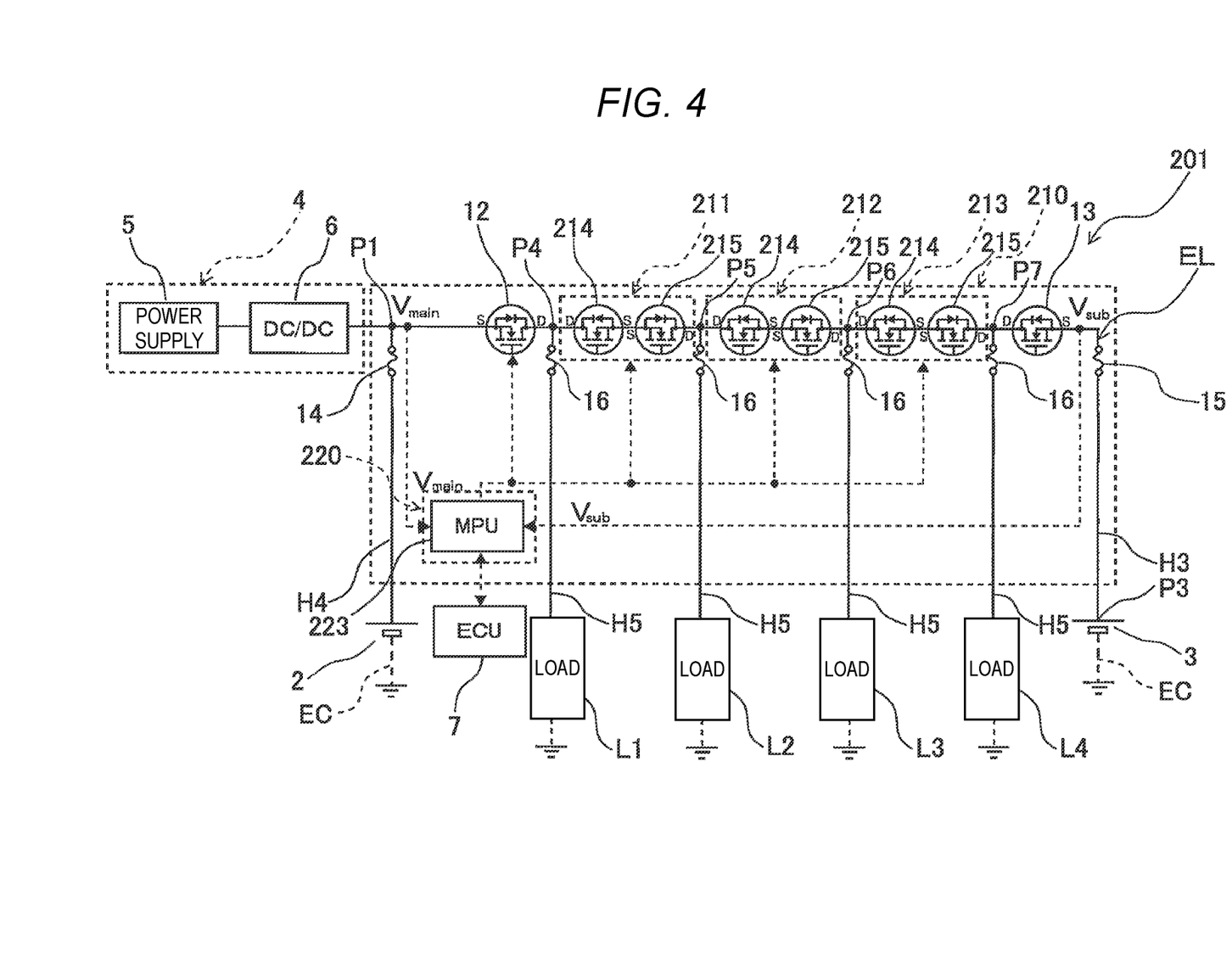
FIG. 4 is a diagram showing an in-vehicle power supply system including a power supply switching control system according to another embodiment of the present disclosure.

FIG. 4 is a diagram showing an in-vehicle power supply system 201 including a power supply switching control system 210 according to another embodiment of the present disclosure. The same reference numerals are given to configurations similar to those of the above-described embodiment, and description of the above-described embodiments is incorporated.

As shown in FIG. 4, in the in-vehicle power supply system 201 of the present embodiment, a plurality of loads L1, L2, L3, and L4 are connected in parallel to the power supply path EL. Further, the power supply switching control system 210 according to the present embodiment includes the first switch 12 and the second switch 13 provided in the power supply path EL, and first to third switch units 211, 212, and 213 provided between the first switch 12 and the second switch 13 of the power supply path EL.

The plurality of loads L1, L2, L3, and L4 are provided in an order of the load L1, the load L2, the load L3, and the load L4 from a power supply unit 4 side. The first switch 12 is provided between the connection point P1 of the main battery 2 and a connection point P4 of the load L1 of the power supply path EL. The second switch 13 is provided between a connection point P7 of the load L4 and the connection point P3 of the sub-battery 3 of the power supply path EL.

The first to third switch units 211, 212, and 213 are provided in an order of the first switch unit 211, the second switch unit 212, and the third switch unit 213 from the power supply unit 4 side. The first switch unit 211 is provided between the connection point P4 of the load L1 and a connection point P5 of the load L2 of the power supply path EL. The second switch unit 212 is provided between the connection point P5 of the load L2 and a connection point P6 of the load L3 of the power supply path EL. The third switch unit 213 is provided between the connection point P6 of the load L3 and the connection point P7 of the load L4 of the power supply path EL.

The first to third switch units 211, 212, and 213 each include a third switch 214 and a fourth switch 215. The third switch 214 and the fourth switch 215 are N-channel MOSFETs. A source S of the third switch 214 and a source S of the fourth switch 215 are connected to each other, and a drain D of the third switch 214 is connected to the loads L1 to L3 on the power supply unit 4 side with respect to the drain D of the third switch 214. The drain D of the third switch 214 of the first switch unit 211 is also connected to a drain D of the first switch 12.

A drain D of the fourth switch 215 is connected to the loads L2 to L4 on a sub-battery 3 side with respect to the drain D of the fourth switch 215. A drain D of the fourth switch 215 of the third switch unit 213 is also connected to a drain D of the second switch 13.

A control apparatus 220 includes the drivers 21 and 22 (see FIG. 1) for the first switch 12 and the second switch 13, drivers (not shown) for the first to third switch units 211 to 213, and an MPU 223. The drivers for the first to third switch units 211 to 213 are gate drive circuits including resistors, capacitors, and the like, and switch a gate drive voltage applied to the third switch 214 and the fourth switch 215 to a voltage that can be set in the forced on state or a voltage that can be set in the on or off state in response to a control signal output from the MPU 223.

Normally, the MPU 223 sets the first switch 12, the third switch 214, and the fourth switch 215 in the forced on state, and sets the second switch 13 in the off state, so that power is supplied from the power supply unit 4 or the main battery 2 to the plurality of loads L1 to L4. On the other hand, when the sub-battery 3 is charged, the MPU 223 sets the first switch 12, the second switch 13, the third switch 214, and the fourth switch 215 in the forced on state.

Here, in the power supply switching control system 210 of the present embodiment, when a failure such as a ground fault occurs between the first switch 12 and the second switch 13, a failure search control for detecting an occurrence location of the failure is performed. Hereinafter, the failure search control will be described.

Figure 5:
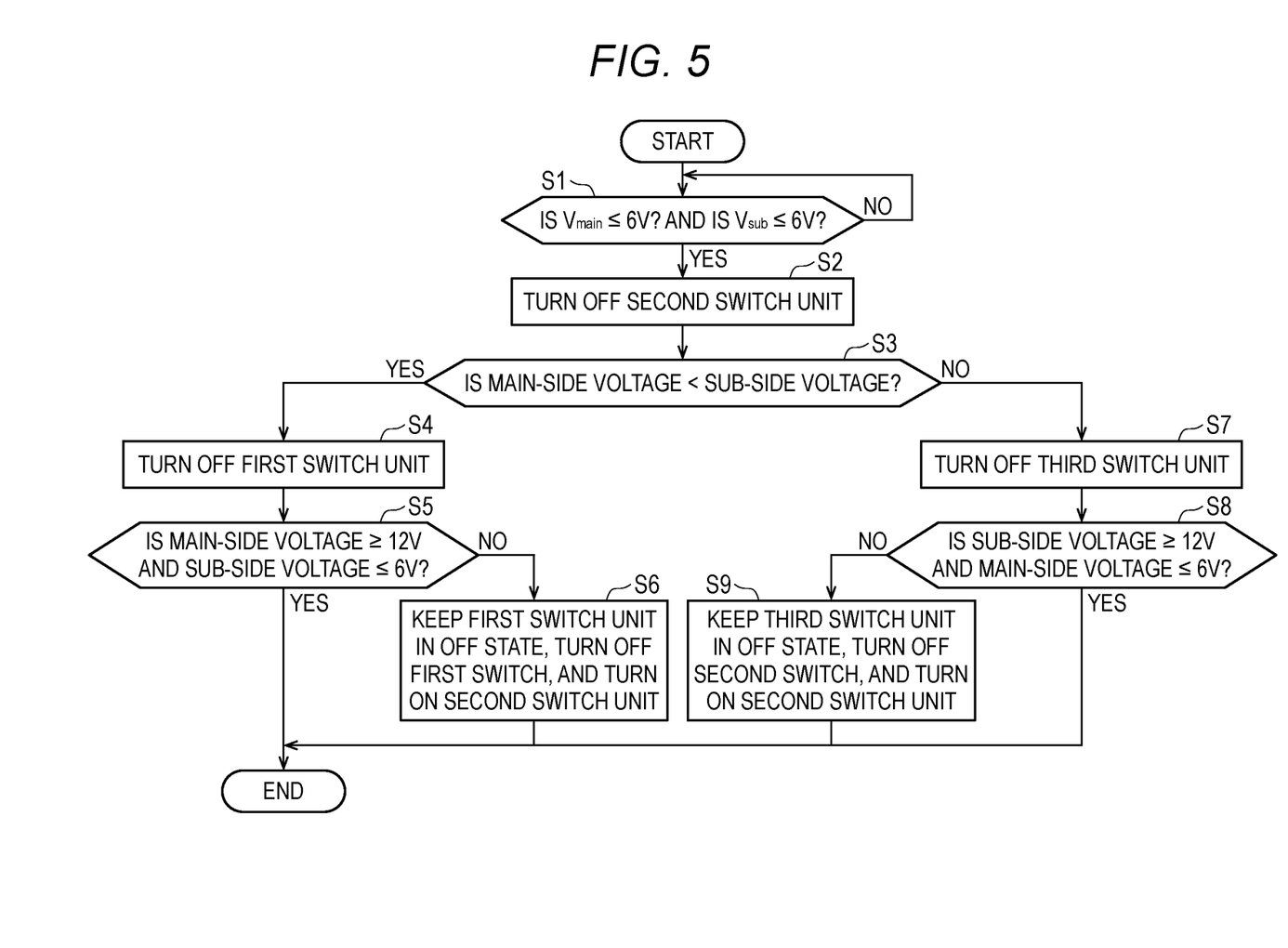
FIG. 5 is a flowchart showing a processing of failure search control of the power supply switching control system shown in FIG. 4.

FIG. 5 is a flowchart showing a processing of the failure search control of the power supply switching control system 210 shown in FIG. 4. Further, FIGS. 6 to 10 are diagrams showing functions when the failure occurs between the first switch 12 and the second switch 13 in the in-vehicle power supply system 201 shown in FIG. 4.

As shown in the flowchart, of FIG. 5, in step 1, the MPU 223 determines whether a voltage Vmain of the main battery 2 and a voltage Vsub of the sub-battery 3 are equal to or lower than a predetermined value (for example, 6V) lower than a value during normal times. When an affirmative determination is made in step 1, the processing shifts to step 2, and when a negative determination is made in step 1, step 1 is repeatedly executed.

Figure 6:
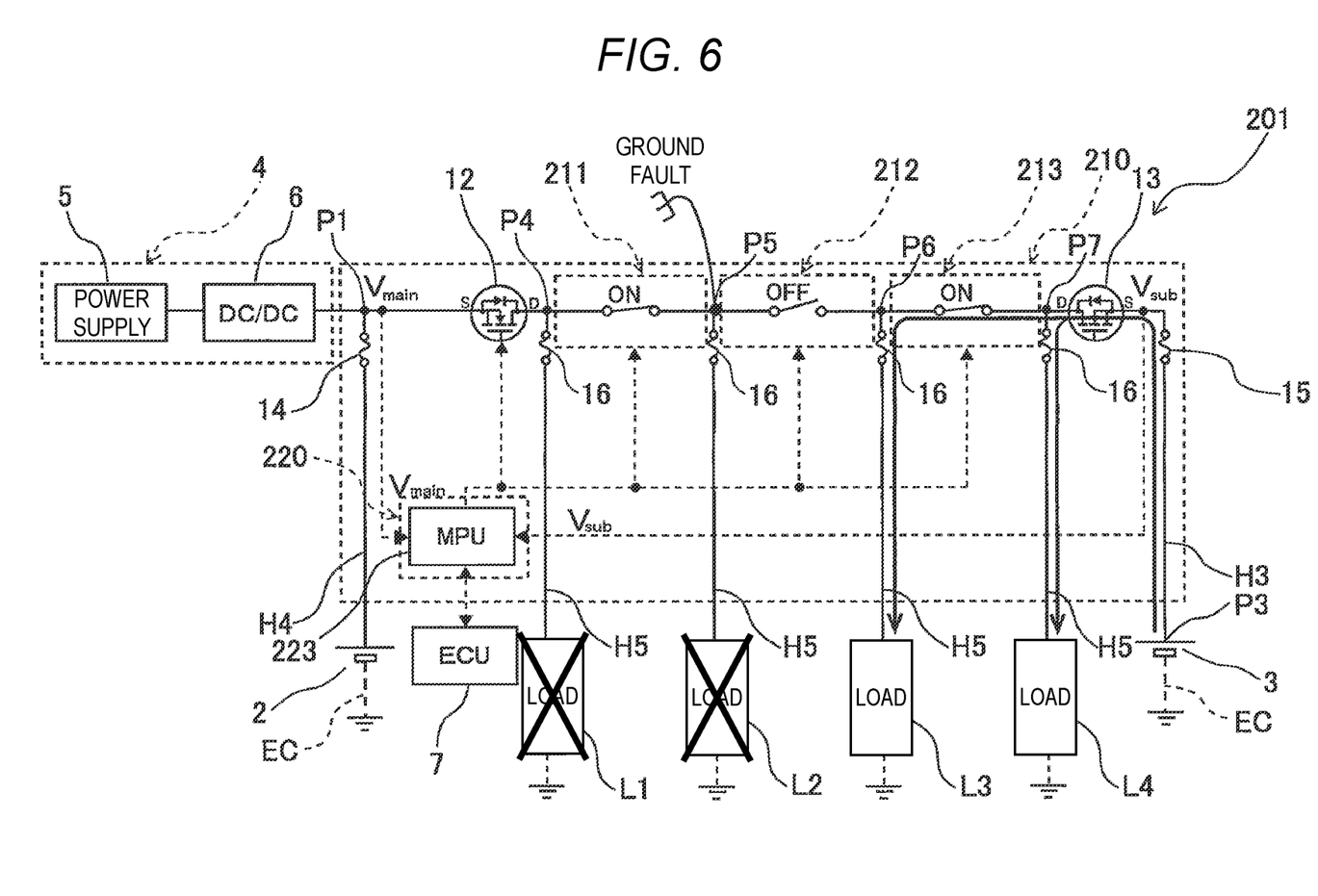
FIG. 6 is a diagram showing functions when a failure occurs between a first switch and a second switch in the in-vehicle power supply system shown in FIG. 4.
Figure 8:
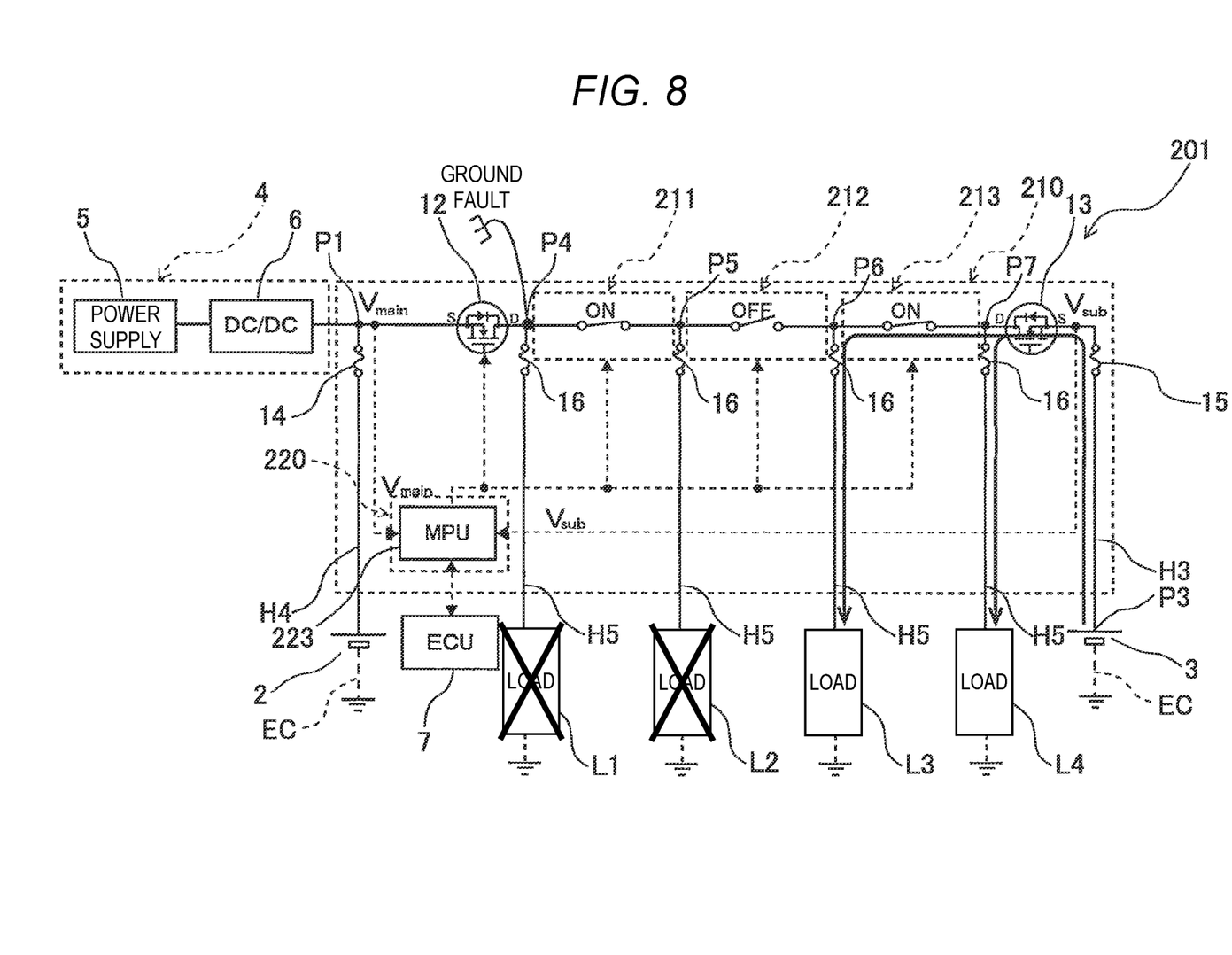
FIG. 8 is a diagram showing functions when a failure occurs between the first switch and the second switch in the in-vehicle power supply system shown in FIG. 4.

In step 2, the MPU 223 sets the second switch unit 212 positioned at a center among the first to third switch units 211 to 213 in the off state. Accordingly, for example, as shown in FIGS. 6 and 8, When a failure such as a ground fault occurs between the second switch unit 212 and the main battery 2, a voltage of the second switch unit 212 on the main battery 2 side is in a decreased state, whereas a voltage of the second switch unit 212 on the sub-battery 3 side returns to 12V. Then, power is supplied from the sub-battery 3 to the loads L3 and L4 between the second switch unit 212 and the sub-battery 3.

As shown in FIG. 5, the processing shifts from step 2 to step 3. In step 3, the MPU 223 determines whether the voltage of the second switch unit 212 on the main battery 2 side is lower than the voltage of the second switch unit 212 on the sub-battery 3 side. When an affirmative determination is made in step 3, the processing shifts to step 4, and when a negative determination is made in step 3, the processing shifts to step 7.

Figure 7:
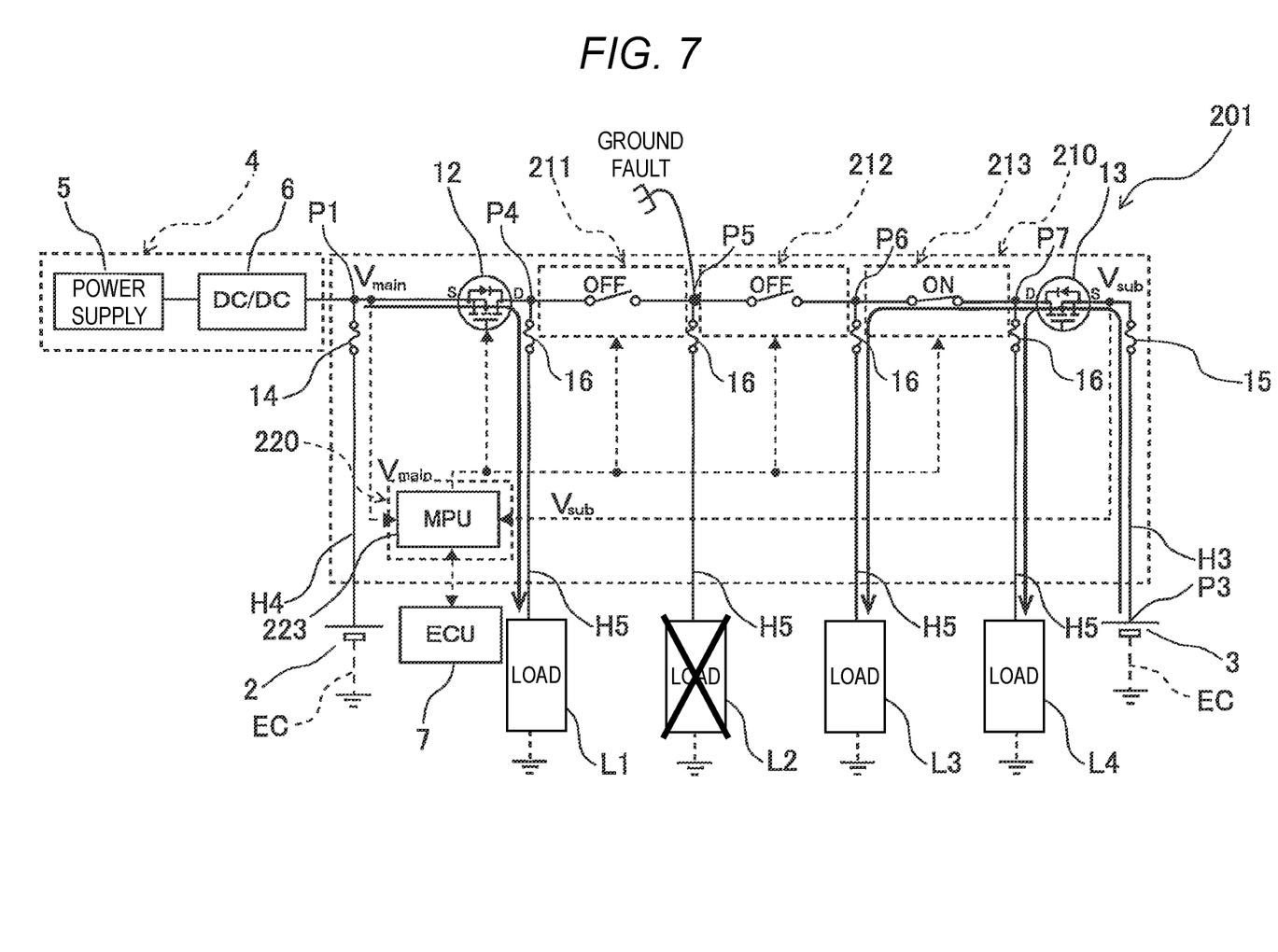
FIG. 7 is a diagram showing functions when a failure occurs between the first switch and the second switch in the in-vehicle power supply system shown in FIG. 4.
Figure 9:
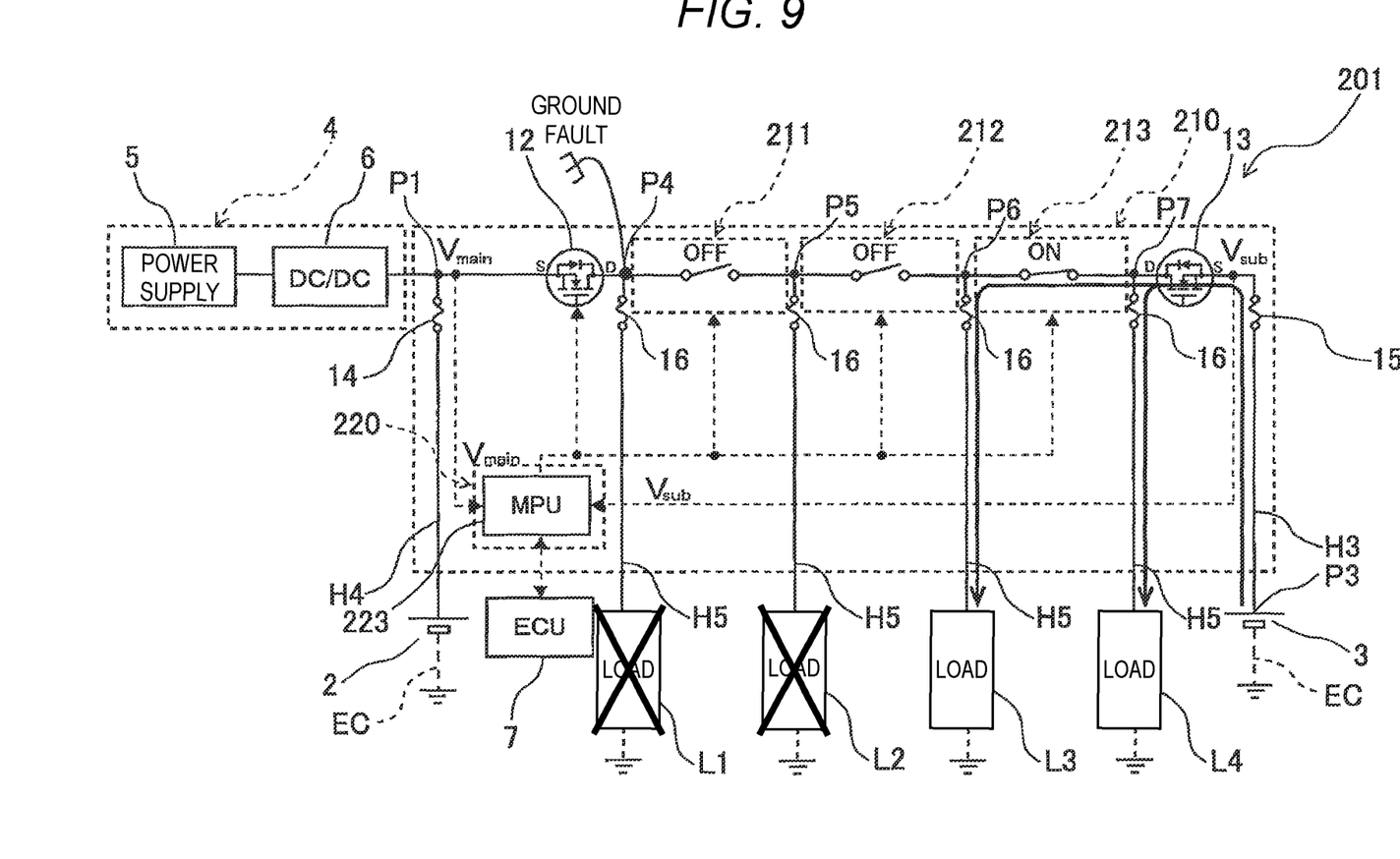
FIG. 9 is a diagram showing functions when a failure occurs between the first switch and the second switch in the in-vehicle power supply system shown in FIG. 4.

In step 4, the MPU 223 sets the first switch unit 211 positioned closest to the main battery 2 side among the first to third switch units 211 to 213 in the off state. Accordingly, for example, as shown in FIG. 7, when a failure such as a ground fault occurs between the first switch unit 211 and the second switch unit 212, a voltage of the first switch unit 211 on the sub-battery 3 side is in a decreased state, whereas a voltage of the first switch unit 211 on the main battery 2 side returns to 12V. Then, power is supplied from the main battery 2 or the power supply unit 4 to the load L1 between the first switch 12 and the first switch unit 211. Further, for example, as shown in FIG. 9, when a failure such as a ground fault occurs between the first switch unit 211 and the first switch 12, voltages of the first switch unit 211 on both the main battery 2 side and the sub-battery 3 side are in a state of being decreased to low voltages (for example, 6V or less).

As shown in FIG. 5, the processing shifts from step 4 to step 5. In step 5, the MPU 223 determines whether the voltage of the first switch unit 211 on the main battery 2 side returns to 12V and whether the voltage of the first switch unit 211 on the sub-battery 3 side is equal to or lower than a predetermined value (for example, 6V) lower than 12V. When an affirmative determination is made in step 5, the processing of the failure search control is ended, and when a negative determination is made in step 5, the processing shifts to step 6.

Figure 10:
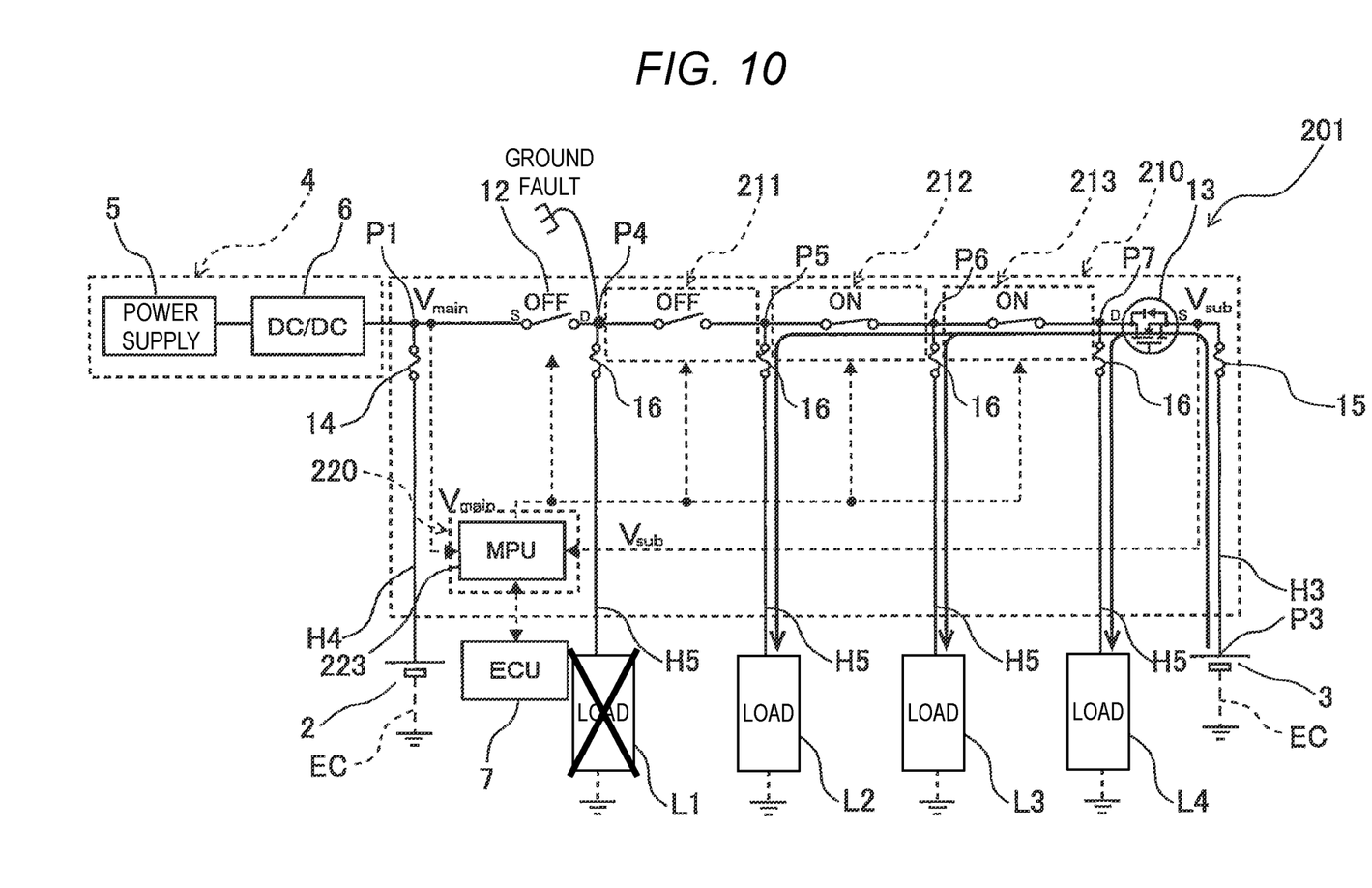
FIG. 10 is a diagram showing functions when a failure occurs between the first switch and the second switch in the in-vehicle power supply system shown in FIG. 4.

In step 6, the MPU 223 keeps the first switch unit 211 in the off state, sets the first switch 12 in the off state, and sets the second switch unit 212 in the forced on state. Accordingly, for example, as shown in FIG. 10, when a failure such as a ground fault occurs between the first switch unit 211 and the first switch 12, the voltage of the first switch unit 211 on the main battery 2 side is in a state of being decreased to a low voltage, whereas the voltage of the first switch unit 211 on the sub-battery 3 side returns to 12V. Then, power is supplied from the sub-battery 3 to the loads L2 to L4 excluding the load L1 closest to the main battery 2 side. After the processing of step 6 is executed, the processing of the failure search control is ended.

In step 7 shifted from step 3, the MPU 223 sets the third switch unit 213 positioned closest to the sub-battery 3 side among the first to third switch units 211 to 213 in the off state. Accordingly, for example, when a failure occurs between the second switch unit 212 and the third switch unit 213, the voltage of the first switch unit 211 on the sub-battery 3 side is in a state of being decreased to a low voltage (for example, 6V or less), whereas the voltage of the first switch unit 212 on the main battery 2 side returns to 12V. Then, power is supplied from the sub-battery 3 to the load L4 between the second switch 13 and the third switch unit 213. Further, for example, when a failure occurs between the third switch unit 213 and the second switch 13, voltages of the third switch unit 213 on both the main battery 2 side and the sub-battery 3 side are in a state of being decreased to low voltages.

The processing shifts from step 7 to step 8. In step 8, the MPU 223 determines whether a voltage of the third switch unit 213 on the sub-battery 3 side returns to 12V, and whether a voltage of the third switch unit 213 on the main battery 2 side is equal to or lower than a predetermined value (for example, 6V) lower than 12V. When an affirmative determination is made in step 8, the processing of the failure search control is ended, and when a negative determination is made in step 8, the processing shifts to step 9.

In step 9, the MPU 223 keeps the third switch unit 213 in the off state, sets the second switch 13 in the off state, and sets the second switch unit 212 in the forced on state. Accordingly, for example, when a failure occurs between the third switch unit 213 and the second switch 13, the voltage of the third switch unit 213 on the sub-battery 3 side is in a decreased state, whereas the voltage of the third switch unit 213 on the main battery 2 side returns to 12V. Then, power is supplied from the main battery 2 to the loads L1 to L3 excluding the load L4 closest to the sub-battery 3 side. After the processing of step 9 is executed, the processing of the failure search control is ended.

As described above, according to the power supply switching control system 210 of the present embodiment, when a failure occurs between the first switch 12 and the second switch 13, power can be supplied from at least one of the main battery 2 or the power supply unit 4 and the sub-battery 3 to the remaining loads excluding any one of the plurality of loads L1 to L4.

Although the present disclosure has been described above based on the embodiments, the present disclosure is not limited to the above-described embodiments, and the above-described embodiments may be modified, or known or well-known technologies may be combined as appropriate, as long as the gist of the present disclosure does not deviate.

For example, the first switch 12 and the second switch 13, which are MOSFETs, are N-channel MOSFETs in the above-described embodiments, but the first switch 12 and the second switch 13 may be P-channel MOSFETs. In this case, a positional relationship between the source S and the drain D may be reversed from those of the above-described embodiments. Further, it is not essential that the first to third switch units 211 to 213 are configured with the MOSFETs, and the MOSFETs may be replaced with other semiconductor switches.

Further, although the high-voltage power supply 5 and the DC/DC converter 6 are provided as the power supply unit 4 in the above-described embodiments, for example, an alternator may be provided as the power supply unit 4, and a voltage conversion unit that steps down high-voltage power, such as a DC/DC converter, may not be provided.

Here, the features of the embodiment of the power supply switching control system according to the present disclosure described above will be briefly summarized and listed in the following [1] to [6].

[1] A power supply switching control system configured to switch a power supply for supplying power to a load (L, L1-L4) between a first power supply (2) and a second power supply (3) in a power supply system (1) that includes the first power supply (2) and the second power supply (3) connected in parallel to the load (L, L1-L4) and in which the first power supply (2), the second power supply (3), and the load (L, L1-L4) are connected through a power supply path (EL) from a side of a power supply unit (4) in an order of the first power supply (2), the load (L, L1-L4), and the second power supply (3), the power supply switching control system comprising:

a first switch (12) that is a MOSFET provided between a connection point (P1) of the first power supply (2) and a connection point (P2) of the load (L, L1-L4) in the power supply path (EL) and configured to cut off a current flowing from a side of the second power supply (3) to a side of the first power supply (2) in an off state of the first switch (12);

a second switch (13) that is a MOSFET provided between a connection point (P3) of the second power supply (3) and the connection point (P2) of the load (L, L1-L4) in the power supply path (EL) and configured to cut off a current flowing from a side of the first power supply (2) to a side of the second power supply (3) in an off state of the second switch (13); and a control unit (20,220) configured to set the second switch (13) in an on state when the second power supply (3) is charged.

[2] The power supply switching control system according to the above [1], in which the first switch (12) and the second switch (13) are N-channel MOSFETs; and in which a source (S) of the first switch (12) is connected to the first power supply (2) and the power supply unit (4), a drain (D) of the first switch (12) and a drain (D) of the second switch (13) are connected to each other and connected to the load (L, L1-L4), and a source (S) of the second switch (13) and the second power supply (3) are connected to each other.

[3] The power supply switching control system according to the above [1] or [2], in which when power is supplied from at least one of the power supply unit (4) and the first power supply (2) to the load (L, L1-L4), the control unit (20,220) sets the first switch (12) in an on state and sets the second switch (13) in an off state.

[4] The power supply switching control system according to any one of the above [1] to [3], further comprising:
a plurality of switch units (112) connected in parallel to the power supply path (EL),
in which each of the plurality of switch units (112) includes the first switch (12) and the second switch (13), and each of a plurality of loads (L) is connected between the first switch (12) and the second switch (13) of each of the plurality of switch units (112).

[5] The power supply switching control system according to any one of the above [1] to [3], further comprising:
a plurality of third switches (211, 212, 213) connected in series to the power supply path (EL) and arranged between the first switch (12) and the second switch (13),
in which each of the third switches (211, 212, 213) cuts off a bidirectional current flowing therethrough in an off state thereof; and
in which each of the plurality of loads (L1-L4) is connected between the first switch (12) and one of the third switches (211, 212, 213), between the second switch (13) and another of the third switches (211, 212, 213), and between the third switches (211, 212, 213) in the power supply path (EL).

[6] The power supply switching control system according to the above [5],
in which the control unit (220) sets any one of the plurality of third switches (211, 212, 213) in an off state, sets other third switches (211, 212, 213), the first switch (12), and the second switch (13) in an on state, and compares a first voltage (V1) between any one of the plurality of third switches (211, 212, 213) and the first power supply (2) with a second voltage (V2) between any one of the plurality of third switches (211, 212, 213) and the second power supply (3);
in which when the first voltage (V1) is lower than the second voltage (V2), the control unit 220) sets the third switch between any one of the plurality of third switches (211, 212, 213) and the first switch (12) in an off state, and further when the first voltage (V1) and the second voltage (V2) are predetermined low voltages, the control unit (220) sets the first switch (12) in an off state and sets any one of the plurality of third switches (211, 212, 213) from an off state to an on state; and
in which when the second voltage (V2) is higher than the first voltage (V1), the control unit (220) sets the third switch between any one of the plurality of third switches (211, 212, 213) and the second switch (13) in an off state, and further when the first voltage (V1) and the second voltage (V2) are predetermined low voltages, the control unit (220) sets the second switch (13) in an off state and sets any one of the plurality of third switches (211, 212, 213) from an off state to an on state.

What is claimed is:

1. A power supply switching control system configured to switch a power supply for supplying power to a load between a first power supply and a second power supply in a power supply system that includes the first power supply and the second power supply connected in parallel to the load and wherein the first power supply, the second power supply, and the load are connected through a power supply path from a side of a power supply unit in an order of the first power supply, the load, and the second power supply, the power supply switching control system comprising:
a first switch that is a MOSFET provided between a connection point of the first power supply and a connection point of the load in the power supply path and configured to cut off a current flowing from a side of the second power supply to a side of the first power supply in an off state of the first switch;
a second switch that is a MOSFET provided between a connection point of the second power supply and the connection point of the load in the power supply path and configured to cut off a current flowing from a side of the first power supply to a side of the second power supply in an off state of the second switch;
a control unit configured to set the second switch in an on state when the second power supply is charged, and
at least one third switch connected to the power supply path and arranged between the first switch and the second switch,
wherein the load is connected between the third switch and one of the first switch and the second switch.

2. The power supply switching control system according to claim 1,
wherein the first switch and the second switch are N-channel MOSFETs; and
wherein a source of the first switch is connected to the first power supply and the power supply unit, a drain of the first switch and a drain of the second switch are connected to each other and connected to the load, and a source of the second switch and the second power supply are connected to each other.

3. The power supply switching control system according to claim 1,
wherein when power is supplied from at least one of the power supply unit and the first power supply to the load, the control unit sets the first switch in an on state and sets the second switch in an off state.

4. The power supply switching control system according to claim 3, further comprising:
a plurality of switch units connected in parallel to the power supply path,
wherein each of the plurality of switch units includes the first switch and the second switch, and each of a plurality of loads is connected between the first switch and the second switch of each of the plurality of switch units.

5. The power supply switching control system according to claim 1,
wherein the at least one third switch is a plurality of third switches all connected in series to the power supply path and arranged between the first switch and the second switch,
wherein each of the third switches cuts off a bidirectional current flowing therethrough in an off state thereof; and
wherein each of the plurality of loads is connected between the first switch and one of the third switches, between the second switch and another of the third switches, and between the third switches in the power supply path.

6. The power supply switching control system according to claim 5,
wherein the control unit sets any one of the plurality of third switches in an off state, sets other third switches, the first switch, and the second switch in an on state, and compares a first voltage V1 between any one of the plurality of third switches and the first power supply with a second voltage V2 between any one of the plurality of third switches and the second power supply;

wherein when the first voltage V1 is lower than the second voltage V2, the control unit sets the third switch between any one of the plurality of third switches and the first switch in an off state, and further when the first voltage V1 and the second voltage V2 are predetermined low voltages, the control unit sets the first switch in an off state and sets any one of the plurality of third switches from an off state to an on state; and wherein when the second voltage V2 is higher than the first voltage V1, the control unit sets the third switch between any one of the plurality of third switches and the second switch in an off state, and further when the first voltage V1 and the second voltage V2 are predetermined low voltages, the control unit sets the second switch in an off state and sets any one of the plurality of third switches from an off state to an on state.

* * * * *